United States Patent
Krabach et al.

(10) Patent No.: US 12,541,655 B2
(45) Date of Patent: Feb. 3, 2026

(54) MONITORING COMPLIANCE OF A GENERATIVE LANGUAGE MODEL WITH AN OUTPUT CHARACTERISTIC RUBRIC

(71) Applicant: Microsoft Technology Licensing, LLC, Redmond, WA (US)

(72) Inventors: Brian Scott Krabach, Snohomish, WA (US); Paul Robert Payne, Seattle, WA (US); Samuel Edward Schillace, Portola Valley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

(21) Appl. No.: 18/483,394

(22) Filed: Oct. 9, 2023

(65) Prior Publication Data
US 2025/0077795 A1    Mar. 6, 2025

Related U.S. Application Data

(60) Provisional application No. 63/580,644, filed on Sep. 5, 2023.

(51) Int. Cl.
*G06F 17/27*  (2006.01)
*G06F 16/35*  (2019.01)
*G06F 40/40*  (2020.01)

(52) U.S. Cl.
CPC .............. *G06F 40/40* (2020.01); *G06F 16/35* (2019.01)

(58) Field of Classification Search
CPC .......... G06F 40/30; G06F 40/40; G06F 16/35; G10L 15/197
USPC ........................................................... 704/9
See application file for complete search history.

(56) References Cited

U.S. PATENT DOCUMENTS 6,418,431 B1 *  7/2002  Mahajan ............... G10L 15/197
11,516,158 B1   11/2022  Luzhnica

OTHER PUBLICATIONS

International Search Report and Written Opinion received for PCT Application No. PCT/US2024/039968, Nov. 7, 2024, 13 pages.
Peng, et al., "Check Your Facts and Try Again: Improving Large Language Models with External Knowledge and Automated Feedback", arXiv preprint arXiv:2302.12813, Feb. 24, 2023, 14 pages.
Thomas F. Heston, "Prompt Engineering For Students of Medicine and Their Teachers", arXiv preprint arXiv:2308.11628, Aug. 8, 2023, 96 pages.

* cited by examiner

*Primary Examiner* — Md S Elahee
(74) *Attorney, Agent, or Firm* — Alleman Hall LLP

(57) ABSTRACT

A computing system for monitoring language model compliance with a rubric of one or more output characteristics. The computing system includes processing circuitry configured to interface with a trained generative language model that receives input of a prompt including natural language text input and, in response, generates an output that includes natural language text output. The processing circuitry is further configured to monitor compliance of the generative language model with the rubric, by feeding the output of the generative language model to a rubric classifier configured to generate a predicted classification for an output characteristic in the rubric, and output the predicted classification.

20 Claims, 7 Drawing Sheets

MONITORING COMPLIANCE OF A GENERATIVE LANGUAGE MODEL WITH AN OUTPUT CHARACTERISTIC RUBRIC

CROSS REFERENCE TO RELATED APPLICATIONS

This application claims priority to U.S. Provisional Patent Application No. 63/580,644, filed Sep. 5, 2023, the entirety of which is hereby incorporated herein by reference for all purposes.

BACKGROUND

Pre-trained generative machine learning models recently have been developed that can generate natural language output in response to natural language input. Chatbots and other software programs that utilize such generative language models have, in a short time, become fundamental components of many types of human-computer interaction, such as searching for information via the Internet. Such generative language models can often generate concise and relevant responses to user prompts, saving users the time of searching for and synthesizing information from various sources on their own. These models are constantly being changed and updated, and these model changes and updates have been found to cause changes in certain characteristics of the responses given by the models, as discussed in more detail below.

SUMMARY

To address the above issues, a computing system is provided for monitoring language model compliance with a rubric of one or more output characteristics. The computing system includes processing circuitry configured to interface with a trained generative model that receives input of a prompt including natural language text input and, in response, generates an output that includes natural language text output. The processing circuitry is further configured to monitor compliance of the generative model with the rubric, by feeding the output of the generative model to a rubric classifier configured to generate a predicted classification for an output characteristic in the rubric, and output the predicted classification.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1A:
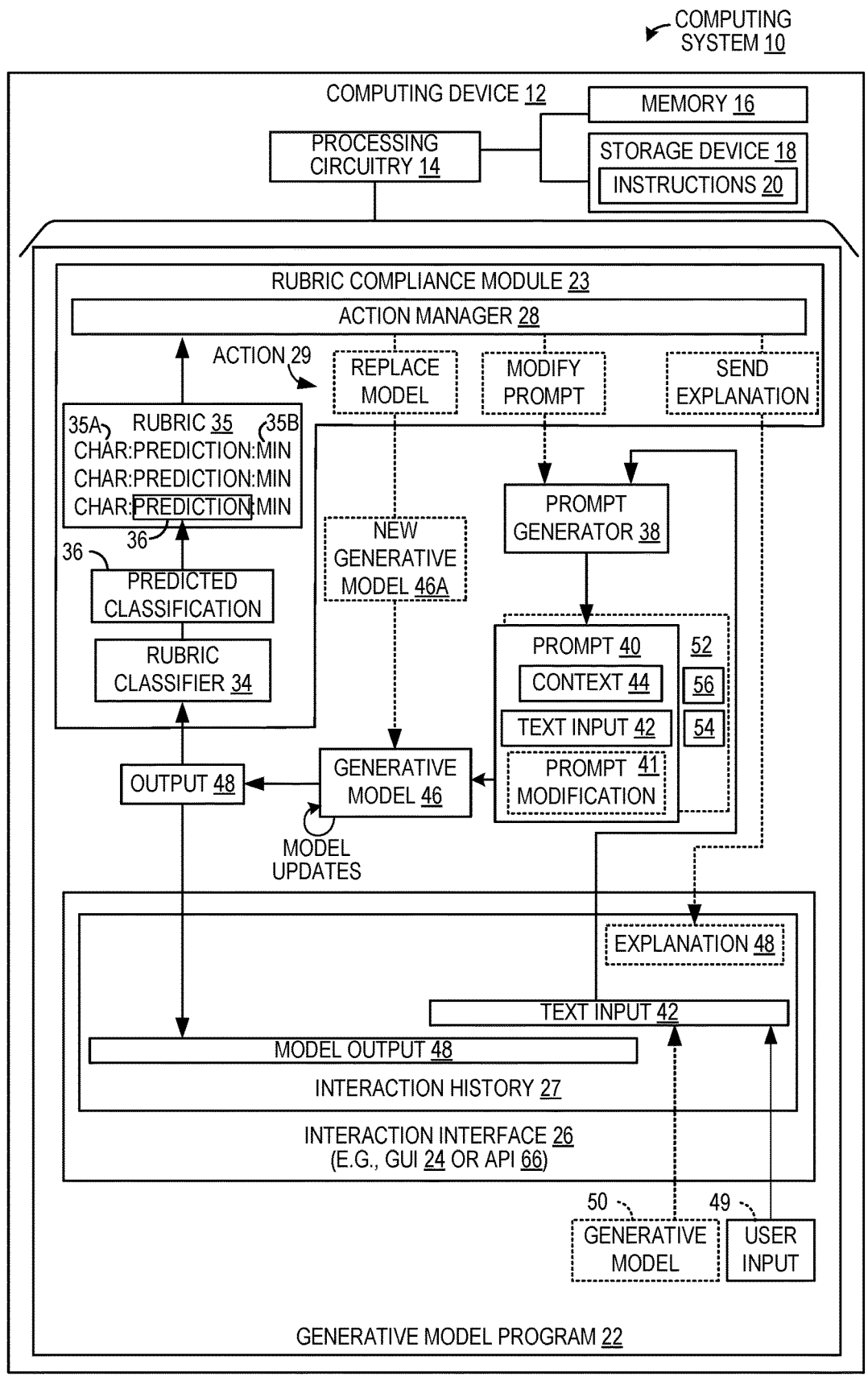
FIG. 1A is a schematic view showing a computing system according to a first example implementation.

Various types of generative language models have been developed, and each can exhibit slightly different response characteristics from the point of view of the user, resulting in a slightly varying user experience between models. Further, each individual generative language model can exhibit different characteristics over time as the model is updated in response to continual learning by the model. As one example, a generative language model that tends to provide brief responses to user prompts may drift over time to output more lengthy responses. As another example, a generative language model that initially provides responses written in a more formal style may drift over time to provide responses are written in a more colloquial style. Such drift in the 'character' or 'personality' of a model can be especially problematic if a model that was originally designed to output inoffensive content begins outputting offensive responses including the use of expletives, foul language, or other inappropriate speech patterns, degrading the expected user experience. Significant technical challenges exist to gauging such characteristics of generative language models due to the variability and complexity of natural language itself, and the unpredictability of feedback training based on actual user interactions, which may include content not previously seen by the model that alters the 'character' or 'personality' of the model in unexpected ways.

To address the issues described above, FIG. 1A illustrates a schematic view of a computing system 10 for monitoring compliance with a rubric of output characteristics of a trained generative model 46, according to a first example implementation. For the sake of clarity, the trained generative model 46 will be henceforth referred to as a trained generative language model 46. However, it will be noted that the term 'trained generative language model' is merely illustrative, and the underlying concepts encompass a broader range of generative models, including multi-modal models, diffusion models, and generative adversarial networks, which can be configured to receive text, image, and/or audio inputs and generate text, image, and/or audio outputs, as discussed in further detail below.

The computing system 10 includes a computing device 12 having processing circuitry 14, memory 16, and a storage device 18 storing instructions 20. In this first example implementation, the computing system 10 takes the form of a single computing device 12 storing instructions 20 in the storage device 18, including a generative model program 22 that is executable by the processing circuitry 14 to perform the various functions described herein.

At a high level, the generative model program 22 implements an interaction interface 26 by which a text input 42 is received, and passes the text input 42 to a prompt generator 38, which generates a prompt 40 based on the text input 42. The prompt 40 is input to a generative model 46, which in turn generates output 48 which can be passed to interaction interface 26. In a typical turn based chat bot implementation, this process can happen multiple times in a session, and the record of multiple text inputs 42 and outputs 48 forms an interaction history 27, the full or abbreviated content of which can be provided in the context 44 of each prompt 40 sent to the generative model 46 so that subsequent responses can take into account the context 44 of the interaction history 27.

The generative model program 22 further includes a rubric compliance module 23 that monitors the output 48 for compliance with compliance targets 35B for output characteristics 35A defined in a rubric 35, by making a prediction of a predicted classification 36 of each output characteristic 35A for the output 48. An action manager 28 of the rubric compliance module 23 is configured to take an action 29 in response to the prediction made during compliance monitoring, such as sending an explanation 48 of the model behavior to the interaction interface 26, or modifying prompts 40 used by the prompt generator 38 or replacing the generative model 46 with a new generative model 46A in an attempt to bring the generative model 46 into compliance with compliance targets 35B for each output characteristic 35A in the rubric 35.

The processing circuitry 14 executing the generative model program 22 is configured to interface with the trained generative language model 46 that receives input of a prompt 40 including natural language text input 42 and, in response, generate an output 48 that includes natural language text output. The processing circuitry 14 executing the generative model program 22 is further configured to monitor compliance of the generative language model 46 with the rubric 35, by feeding the output 48 of the generative language model 46 to the rubric classifier 34, which is configured to generate a predicted classification 36 for an output characteristic 35A in the rubric 35, and output the predicted classification 36 to the interaction interface 26. As discussed below, the interaction interface 26 may be a graphical user interface 24, an application programming interface (API) 66, etc. The output characteristic 35A is a characteristic of the output of the generative language model 46, examples of which are given below. The rubric classifier 34 may be the generative language model 46 or a classifier that is different from the generative language model 46, such as a different generative model or one or more specially trained neural networks.

The processing circuitry 14 is configured to cause the interaction interface 26 for the trained generative language model 46 to be instantiated. As briefly discussed above, the interaction interface 26 may be a graphical user interface (GUI) 24 that is displayed on a display, and configured to receive user input 49 and visually present information to the user. In other instances, the interaction interface 26 may be presented in non-visual formats such as an audio interface for receiving and/or outputting audio, such as may be used with a digital assistant. In yet another example the interaction interface 26 may be implemented as an application programming interface (API) 66 configured to receive text input 42 that is programmatically generated by a second generative model 50, discussed below. In such a configuration, the input to the interaction interface 26 may be made by an API call from a calling software program to the API 66, and output may be returned in an API response from the API 66 to the calling software program. It will be understood that distributed processing strategies may be implemented to execute the software described herein, and the processing circuitry 14 therefore may include multiple processing devices, such as cores of a central processing unit, co-processors, graphics processing units, field programmable gate arrays (FPGA) accelerators, tensor processing units, etc., and these multiple processing devices may be positioned within one or more computing devices, and may be connected by an interconnect (when within the same device) or via a packet switched network links (when in multiple computing devices), for example. In such implementations, the processing circuitry 14 may be configured to execute the API 66 as the interaction interface 26 for the trained generative language model 46.

In general, the processing circuitry 14 may be configured to receive, via the interaction interface 26 (e.g., via GUI 24, API 66, etc.), natural language text input 42. The text input 42 incorporated into a prompt 40. The prompt generator 38 generates the prompt 40 based at least on natural language text input 42 from the user. The prompt 42 may include the text input 42 or a processed version thereof. To produce the processed version of the text input 42, a natural language processing pipeline may be implemented to process the raw text input 42 from the user input 49 to thereby produce a processed text input 42, for example, in a standardized format with correct grammar and spelling, which can improve the potential effectiveness of the generative model 46.

The prompt 40 is provided to the trained generative language model 46. The trained generative language model 46 receives the prompt 40, which includes the natural language text input 42 from the user for the trained generative language model 46 to generate an output 48, and generates, in response to the prompt 40, the output 48 which is outputted to the user. It will be understood that the natural language text input 42 may also be generated by and received from a software program such as the generative model 50, rather than directly from a human user.

The trained generative language model 46 is a generative model that has been configured through machine learning to receive input that includes natural language text and generate output that includes natural language text in response to the input. It will be appreciated that the trained generative language model 46 can be a large language model (LLM) having tens of millions to billions of parameters, non-limiting examples of which include GPT-3 and BLOOM. The trained generative language model 46 can be a multi-modal generative model configured to receive multi-modal input including natural language text input as a first mode of input and image, video, or audio as a second mode of input, and generate output including natural language text based on the multi-modal input. The output of the multi-modal model may additionally include a second mode of output such as image, video, or audio output. Non-limiting examples of multi-modal generative models include Kosmos-1, GPT-4 VISUAL (and LLaMA). Further, the trained generative language model 46 can be configured to have a generative pre-trained transformer architecture, examples of which are used in the GPT-3 and GPT-4 models.

A rubric, of which rubric 35 is one example, will be understood herein to refer to a predetermined and structured set of criteria or guidelines that are employed to assess, measure, and characterize characteristics of the output of the generative language model 46. The characteristics of the output embody what may be referred to as the 'character' of the generative language model 46. The characteristics entail the distinct features, style, persona, disposition, voice, identity, temperament, attitude, character traits, or other characteristics that the model 46 displays when generating responses or content, as guided by the parameters of the model 46 and the learned patterns from the training data used to train the model 46.

In other words, the output characteristics of a language model 46 can be thought of collectively as its 'personality' or 'voice'—how the model 46 sounds, responds, or behaves when interacting with users or creating content. Rubric 35, thus, serves as a systematic approach to gauge generative language model output characteristics such as, but not limited to, cultural sensitivity, fairness, inclusivity, wittiness, assertiveness, patience, friendliness, formality, empathy, profanity, verbosity, tone, topical relevance, factuality, and creativity. Other characteristics which are gauged by the rubric may also include thought processes, thought forms (tangentiality, circumstantiality), insight, and judgment. Rubric classifier 34 is trained to classify output 48 into predicted classifications of output characteristics in the rubric 35. Accordingly, the performance of the language model 46 can be evaluated by the rubric classifier 34 across these dimensions reflected in rubric 35, providing a comprehensive understanding of the output characteristics 35A of the language model 46.

Figure 2:
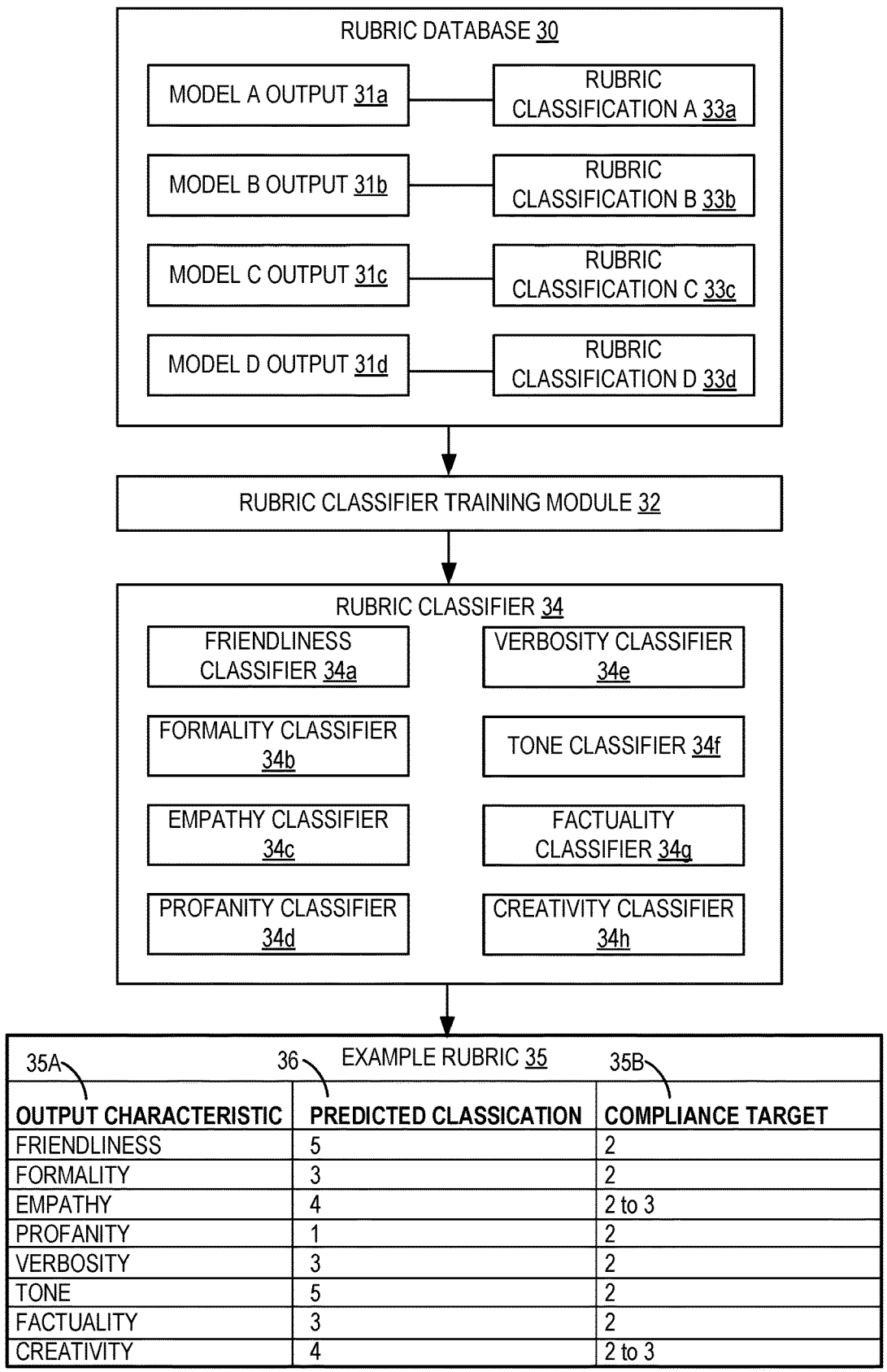
FIG. 2 is a schematic view showing the training of the rubric classifier of FIG. 1A according to an example implementation.

Referring now to FIG. 2, a conceptual illustration of the training process for the rubric classifier 34 is depicted. Rubric classifier training module 32 is configured to train the rubric classifier 34 using a rubric database 30, which in the illustrated example comprises outputs 31a-d of a plurality of generative language models with one or more output characteristics evaluated by human or machine evaluators observing the outputs 31a-d or responses of each model to a variety of prompts, and then scoring or rating the performance of each generative language model for each output characteristic that is evaluated. For example, the one or more output characteristics may include friendliness, formality, empathy, profanity, verbosity, tone, topical relevance, factuality, and creativity. For each characteristic, human or machine evaluators may score or rate the performance of the generative language model on a numerical scale, which may be from 1 to 5 as one specific non-limiting example. Each of the generative language models evaluated in the rubric database 30 may have a corresponding score for each of the one or more output characteristics.

In this example, the rubric database 30 accommodates the storage of several model outputs 31a-d from different generative language models. These model outputs 31a-d are used to store output from a plurality of generative language models that are subject to evaluation within the rubric database 30.

Each of model outputs 31a-d may represent and record user interaction histories, which are associated with distinctive generative language models. Each of these model outputs 31a-d may be attributed with a specific predicted classification. In this example, the first model output 31a is assigned a first predicted classification 33a, the second model output 31b is assigned a second predicted classification 33b, the third model output 31c is assigned a third predicted classification 33c, and the fourth model output 31d is assigned a fourth predicted classification 33d.

Furthermore, the first model output 31a may encompass user interaction histories with a first generative language model, where this model is assigned the first predicted classification 33a as determined by an evaluator. Similarly, the second model output 31b houses user interaction histories with a second generative language model, being assigned the second predicted classification 33b. The third model output 31c and fourth model output 31d follow the same pattern, storing user interaction histories with the third and fourth generative language models, and being assigned the third predicted classification 33c and the fourth predicted classification 33d, respectively.

The assignment of predicted classifications 33a-d may be conducted by either a human evaluator or an automated machine evaluator, and these classifications serve as reference standards for the generative language models represented by the respective model outputs. For example, for the formality rubric, the evaluator may assign a score of 5 to the first model output 31a when the evaluator deems that the first generative language model consistently uses language that matches the level of formality of the context of the user interactions indicated in the first model output 31a. For the friendliness rubric, the evaluator may assign a score of 5 to the first model output 31a when the evaluator deems that the first generative language model consistently uses friendly, welcoming, and positive language in the user interactions indicated in the first model output 31a. The formality score of 5 and the friendliness score of 5 may be recorded in the first predicted classification 33a assigned to the first model output 31a.

For friendliness, human or machine evaluators may rate a generative language model's ability to use warm, amicable language and to respond to queries in a way that builds rapport and fosters positive interactions. A score of 1 may indicate that the model consistently uses inappropriate or abrasive language, while a score of 5 may indicate that the model consistently uses friendly, welcoming, and positive language.

For formality, human or machine evaluators may rate a generative language model's ability to use language that matches the expected level of formality, based on the context of the user interaction with the generative language model. A score of 1 may indicate that the model consistently uses language that is either excessively formal or informal for the context, while a score of 5 may indicate that the model consistently uses language that matches the level of formality of the context of the user interaction.

For empathy, human or machine evaluators may rate a generative language model's ability to understand, reflect, and respond to the emotional states expressed by the user. A score of 1 may indicate that the model consistently fails to acknowledge or respond to the emotional states of the user, while a score of 5 may indicate that the model consistently acknowledges and responds appropriately to the emotional states of the user.

For profanity, human or machine evaluators may rate a generative language model's use or avoidance of inappropriate or offensive language. A score of 1 may indicate that the model consistently uses offensive or inappropriate language. A score of 5 may indicate that the model consistently avoids using offensive or inappropriate language.

For verbosity, human or machine evaluators may rate a generative language model's ability to provide information in a concise and clear manner. A score of 1 may indicate that the model consistently provides excessively long, unclear, or redundant responses. A score of 5 may indicate that the model consistently provides clear, concise, and relevant responses.

For tone, human or machine evaluators may rate a generative language model's ability to use language that matches the tone expected or desired by the user. A score of 1 may indicate that the model consistently uses a tone that is inappropriate or mismatched to the context or the user's expectations. A score of 5 may indicate that the generative language model consistently uses a tone that is appropriate and matches the user's expectations.

For topical relevance, human or machine evaluators may rate a generative language model's ability to stay on topic and provide relevant responses. A score of 1 may indicate that the model consistently strays off topic or provides irrelevant responses. A score of 5 may indicate that the model consistently stays on topic and provides relevant responses.

For factuality, human or machine evaluators may rate a generative language model's ability to provide accurate and truthful information. A score of 1 may indicate that the model consistently provides inaccurate or untruthful information. A score of 5 may indicate that the model consistently provides accurate and truthful information.

For creativity, human or machine evaluators may rate a generative language model's ability to generate new, original, and creative ideas or responses. A score of 1 may indicate that the model consistently provides generic, unoriginal, or repetitive responses. A score of 5 may indicate that the model consistently generates new, original, and creative responses.

The rubric classifier training module 32 may train the rubric classifier 34 to generate a predicted classification for each of a plurality of output characteristics in the rubric 35, for the generative language model 46. In the example of FIG. 2, the rubric classifier 34 includes plurality of classifier models 34a-h, including a friendliness classifier 34a, a formality classifier 34b, an empathy classifier 34c, a profanity classifier 34d, a verbosity classifier 34e, a tone classifier 34f, a factuality classifier 34g, and a creativity classifier 34h. Each of the plurality of classifier models 34a-h has been trained to receive natural language text and generate a predicted classification 36 for a respective one of the plurality of output characteristics 35A, respectively, based on ground truth data. In the example of FIG. 2, the ground truth is the rubric database 30 comprising outputs 31a-d of a plurality of generative language models with corresponding classifications 36 for each of the one or more characteristics 35A. In the illustrated example of FIG. 2, an example rubric 35 is shown with example predicted classifications 36 and compliance targets 35B for each of a plurality of generative language model output characteristics 35A in the rubric 35. In the illustrated example, the predicted classifications 36 are all different from their corresponding compliance targets 35B, which may be single value or a range of values. In this example, the compliance target 35B is a single value of 2 for all the listed output characteristics except for empathy and creativity, which are assigned corresponding compliance targets of 2 to 3. While the term predicted classification is used throughout, the predicted classification 36 may be thought of as a score or rating, as explained herein.

Returning to FIG. 1A, the rubric classifier 34 receives input of the output 48 of the generative language model 46, which is not limited to, but exemplified by an output of an interaction between a chatbot and a user. The rubric classifier 34 is configured to evaluate one or more output characteristics 35A of the language model 46, based on the output 48 of the language model 46, and generate a predicted classification 36 based on the output 48. For each of the one or more output characteristics 35A in the rubric database 30, the rubric classifier 34 may be configured to evaluate a proximity of the output 48 to corresponding scores of a plurality of generative language models evaluated in the rubric database 30, and output the predicted classification 36 as a measure of the proximity of the output 48 to corresponding scores of the outputs of a plurality of generative language models evaluated in the rubric database 30. The predicted classification 36 may be a numerical classification or a qualitative classification. One example of the evaluated characteristic 35A in rubric 35 is exemplified by friendliness. However, the evaluated characteristic 35A is not particularly limited, and may include other characteristics 35A evaluated in the rubric database 30, including formality, empathy, profanity, verbosity, tone, topical relevance, factuality, and creativity, for example. One example of a rubric including these characteristics 35A is shown in FIG. 2, as discussed above.

In the example of FIG. 1A, the rubric classifier 34 may provide a classification on a scale of 1 to 5, where 1 represents non-friendly and 5 represents very friendly. It will be appreciated that other scales or rating systems may be used, such as −5 to +5, 1-10, negative-neutral-positive, or A, B, C, and D, for example. The rubric classifier 34 assesses the friendliness, for example, of the output 48 of the generative language model 46 and generates a friendliness score in producing a final predicted classification 36. A similar process is followed for the other output characteristics 35A in the rubric 35. The rubric classifier 34 may be lightweight, having a relatively small number of parameters, thereby reducing computational demand and increasing efficiency and speed. In some examples, a separate specially trained rubric classifier 34 may be used for each output characteristic 35A.

Responsive to generating the predicted classification 36, the action manager 28 may perform at least one action 29 based upon the predicted classification 36 for the characteristic. The at least one action 29 may include generating a subsequent prompt 40 including a prompt modification 41, which is inputted into the trained generative language model 46 to thereby improve the predicted classification 36 for the characteristic 35A, replacing the trained generative language model 46 with a new (or prior) generative model 46A, generating, via the trained generative language model 46, an explanatory report (e.g., explanation 48) of reasons for the predicted classification 36, and/or other actions.

Regarding model replacement action, the trained generative language model 46 may be replaced to address the predicted classification 36 which is out of compliance or different from the target predicted classification. The replacement of the trained generative language model 46 may include rolling back the implementation of the generative language model 46, and instead implementing a prior version of the generative language model 46 with acceptable classification scores for the rubric of the generative language model 46. Alternatively, a new and improved model may replace the current generative model. As another example, an explanatory report (e.g., explanation 48) of reasons for the predicted classification may be generated via the generative language model 46, and displayed to the user via GUI 24 or outputted via API 66. As examples of such explanations 48, real-time notifications of the predicted classification 36 may be sent to developers of the trained generative language model 46 along with explanations of why the predicted classification 36 was assigned. The developers may receive notifications of the predicted classification 36 through other means, including but not limited to visual reports and interactive dashboards.

To implement the modification of prompt 40, the prompt generator 38 can be configured to receive the predicted classification 36 outputted by the rubric classifier 34, and generate a prompt modification 41 to be incorporated into the prompt 40 that is inputted into the language model 46. The prompt generator 38 may reference target classifications for each characteristic, calculate the difference between the predicted classification and the target classification, and generate a prompt modification 41 based on the calculated difference between the predicted classification and the target classification. For example, when the target classification is scale 3 (medium friendly) and the outputted predicted classification is 1 (non-friendly), the outputted prompt modification 41 may specify an increase in the friendliness of the generated output 48. However, the target classification is not particularly limited, and may be 2 in other implementations. Alternatively, the target classification may be defined as a range between two values, such as between 2 and 3 in one example. This may cause the prompt generator 38 to specify an increase in the friendliness of the generated output 48 when the outputted predicted classification is less than 2, and cause the prompt generator 38 to specify a decrease in the friendliness of the generated output 48 when the outputted predicted classification is greater than 3.

Accordingly, the prompt modification 41 that is incorporated into the prompt 40 may be generated so that the generative language model 46 may generate more accurate, contextually relevant, and engaging output 48 that are in compliance with rubric standards that are defined by target classifications that are used by the prompt generator 38 to generate prompt modifications 41 for the prompts 40.

Figure 1B:
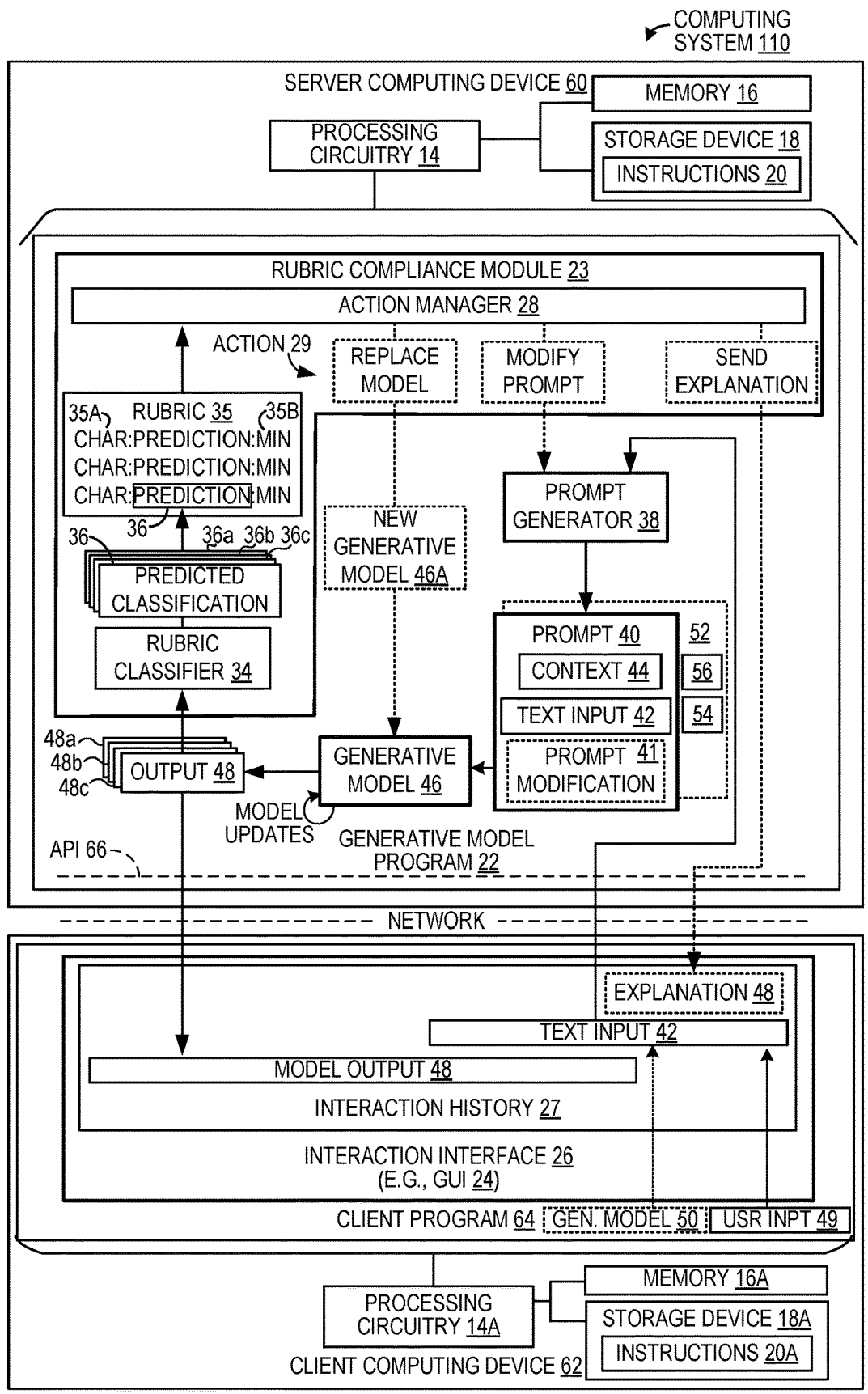
FIG. 1B is a schematic view showing a computing system according to a second example implementation.

Turning to FIG. 1B, a computing system 110 according to a second example implementation is illustrated, in which the computing system 110 includes a server computing device 60 and a client computing device 62. Here, both the server computing device 60 and the client computing device may include respective processors 14, 14A, memory 16, 16A, storage devices 18, 18A, and instructions (e.g., software) 20, 20A that when executed by the processors 14, 14A cause the processors 14, 14A to perform the functions described herein. Description of identical components to those in FIG. 1A will not be repeated for the sake of brevity. The client computing device 62 may be configured to present the interaction interface 26, which in this implementation is, for example, a GUI 24, as a result of executing a client program 64 by the processor 14A of the client computing device 62. The client computing device 62 may be responsible for communicating over a computer network between the user operating the client computing device 62 and the server computing device 60 which executes the generative model program 22 and contains the rubric classifier 34 and the generative language model 46, via an application programming interface (API) 66 of the generative model program 22. The client computing device 62 may take the form of a personal computer, laptop, tablet, smartphone, smart speaker, etc. The same processes described above with reference to FIG. 1A may be performed, except in this case the natural language text input 42 and output 48 may be communicated between the server computing device 60 and the client computing device via a computer network such as the Internet.

In the example of FIG. 1B, it will be appreciated that the generative language model 46 is intermittently updated over a time period. The processing circuitry 14 is configured to monitor compliance by feeding a plurality of outputs 48a-c of the generative language model 46 to the rubric classifier 34 at a series of points in time during the time period, to thereby generate a time-series of predicted classifications 36a-c for the characteristic of the rubric of the generative language model 46. These plurality of outputs 48a-c may be from a plurality of different interaction sessions of different users. Alternatively, these plurality of outputs 48a-c may be from synthetic interaction sessions between the first generative language model 46 and a second generative language model 50. Here, the second generative language model 50 is used to generate synthetic natural language text input 54 which is incorporated into a prompt 52, along with a context 56 generated by the prompt generator 38, and the prompt 52 including the synthetic language text input 54 and the context 56 is inputted into the first generative language model 46.

Figure 3:
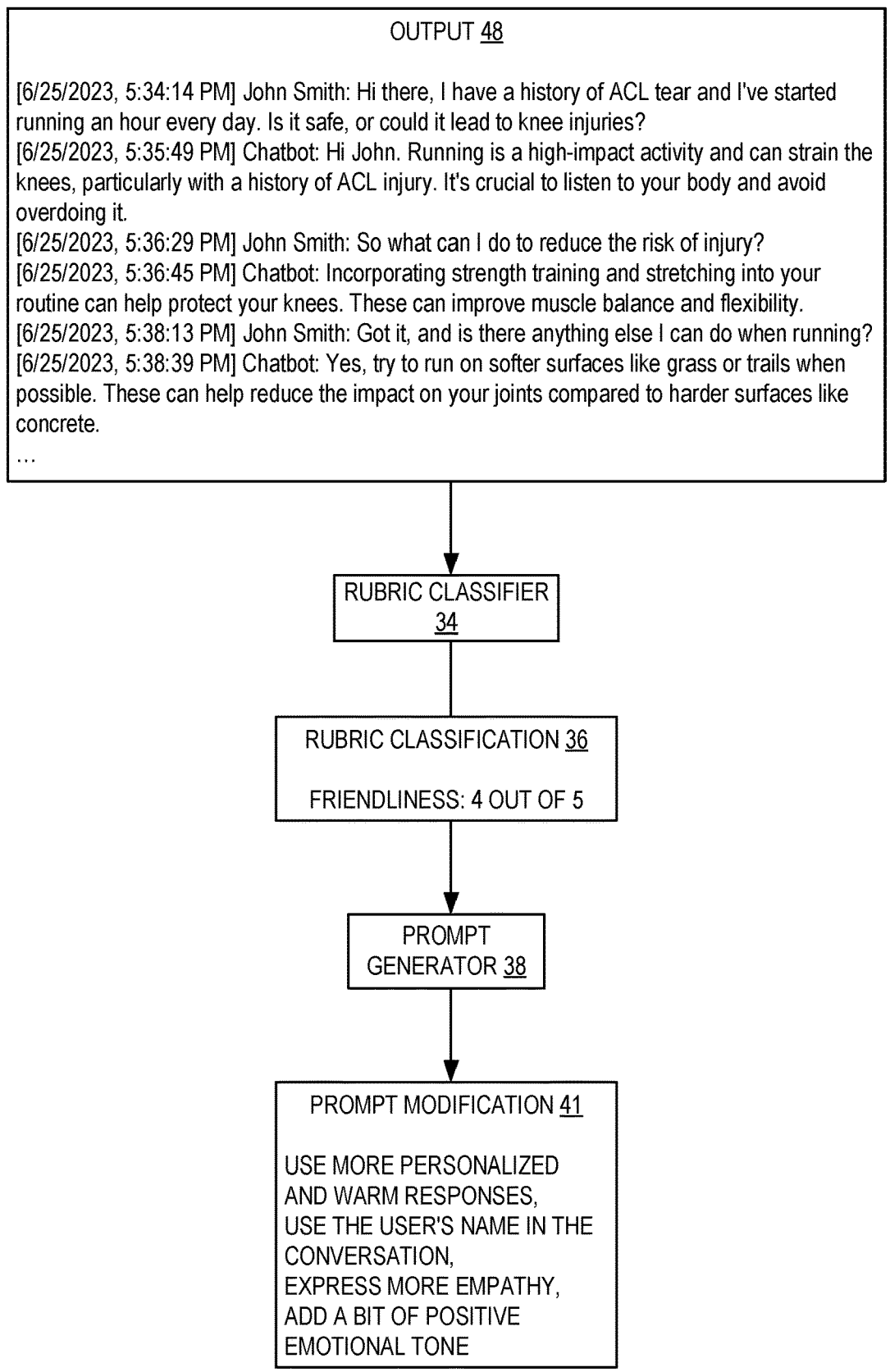
FIG. 3 is a schematic view showing inputs and outputs of the rubric classifier and prompt generator of FIG. 1A according to an example implementation.
Figure 4:
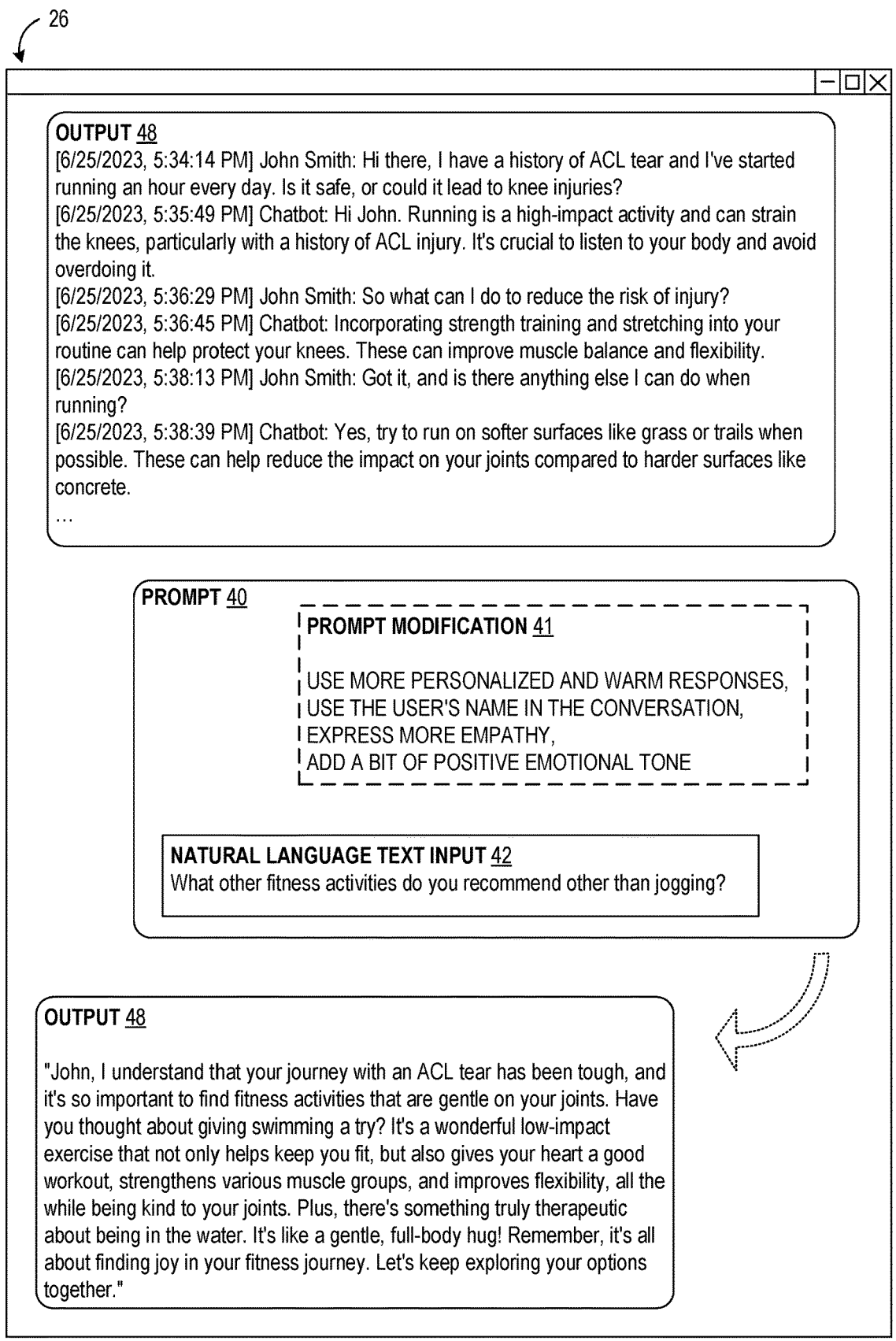
FIG. 4 shows an example graphical user interface of the computing system of FIG. 1A, illustrating the generation of a prompt based on the generated predicted classification and the natural language text input from the user according to an example implementation.

Turning to FIGS. 3 and 4, an example is described of a chat between a user and a chatbot, in which the chatbot receives a modified prompt 40 based on the output 48 of the generative language model 46. As shown in FIG. 3, the output 48 of the generative language model 46 includes exchanges in which John Smith anxiously mentioned his history of ACL tear as he asked if running was a safe workout activity for him. This output 48 is inputted into a rubric classifier 34, which outputs a predicted classification 36 for the output 48 indicating a friendliness score of 4 out of 5. The prompt generator 38 receives the predicted classification 36 as input, determines that the friendliness score of 4 is less than the target friendliness score of 5, and generates a prompt context 44 which suggests, "use more personalized and warm responses, use the user's name in the conversation, express more empathy, add a bit of positive emotional tone" so that the friendliness score of subsequent responses can be raised to a 5.

Turning to FIG. 4, the user asks the chatbot, "What other fitness activities do you recommend other than jogging?" The question is incorporated into the subsequent prompt 40 as a natural language text input 42. The subsequent prompt 40 is also modified to include the prompt modification 41 generated by the prompt generator 38, which indicates the modifications that the output 48 is to incorporate. Therefore, when the user asks the chatbot about other recommended fitness activities in a natural language text input 42 incorporated into the subsequent prompt 40, the trained generative language model 46 generates an output 48 which has a friendlier tone with uses more personalized and warm language, uses the user's name in the output 48, expresses more empathy, and adds some positive emotional tone.

Figure 5:
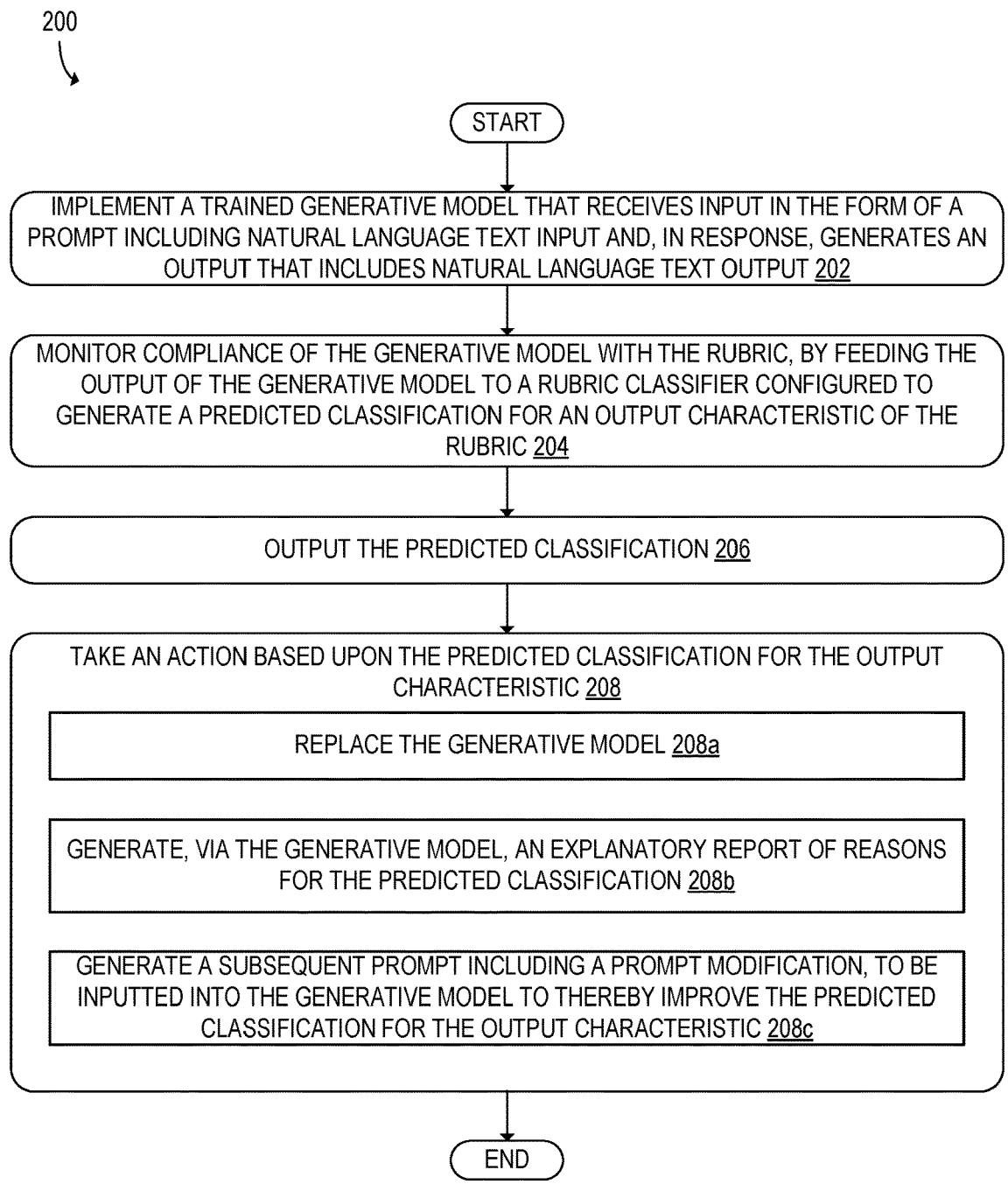
FIG. 5 shows a flowchart for a method according to one example implementation.

FIG. 5 shows a flowchart for a method 200 for monitoring compliance with a rubric which classifies output characteristics of a trained generative language model, according to one example implementation. The method 200 may be implemented by the computing system 10 or 110 illustrated in FIGS. 1A and 1B, or using other suitable computer hardware and software components.

At step 202, the method 200 interfaces with a trained generative model that receives input of a prompt including natural language text input and, in response, generates an output that includes natural language text output. The generative model may be a first generative language model, and the plurality of outputs may be from synthetic interaction sessions between the first generative language model and a second generative language model.

At step 204, the method 200 includes monitoring compliance of the generative language model with the rubric, by feeding the output of the generative language model to a rubric classifier configured to generate a predicted classification for an output characteristic in the rubric. The predicted classification may be a numerical classification or a qualitative classification. The generative language model may be intermittently updated over a time period, and compliance may be monitored by feeding a plurality of outputs of the generative language model to the rubric classifier at a series of points in time during the time period, to thereby generate a time-series of predicted classifications for the output characteristic in the rubric.

When the output characteristic is one of a plurality of output characteristics included in the rubric of the generative model, the rubric classifier may be configured to generate a predicted classification for each of the plurality of output characteristics in the rubric, and at least one of the plurality of output characteristics comprises cultural sensitivity, fairness, inclusivity, wittiness, assertiveness, patience, friendliness, formality, empathy, profanity, verbosity, tone, topical relevance, factuality, and/or creativity. In some embodiments more than one of the output characteristics are selected from the preceding list, such that the rubric includes different output characteristics in the preceding list. The rubric classifier may include a plurality of classifier models, and each of the plurality of classifier models has been trained to receive natural language text and generate a predicted classification for a respective one of the plurality of output characteristics, respectively, based on ground truth data, which may be stored in a rubric database comprising outputs of a plurality of generative language models with corresponding classifications for each of one or more characteristics.

At step 206, the method 200 includes outputting the predicted classification. At step 208, the method 200 includes taking an action based upon the predicted classification for the output characteristic. Step 208 may be step 208a of replacing the generative language model, step 208b of generating, via the generative language model, an explanatory report of reasons for the predicted classification, and/or step 208c of generating a subsequent prompt inputted into the generative language model to thereby improve the predicted classification for the output characteristic.

The above-described system and method provide an effective solution to the problem of assessing and quantifying the characteristics inherent to various generative language models. By using a rubric classifier trained on a rubric database which includes evaluations of the outputs of known generative language models, the system and method enable continuous monitoring and regulation of the rubrics assigned to these generative language models. This, in turn, ensures that the resultant outputs generated by these models adhere strictly to a set of pre-established standards. This arrangement not only can be used to ensure regulatory compliance or compliance with a corporate policy, but also can be used to maintain a consistent quality of output that is enjoyed by users, thereby enhancing the overall performance and reliability of the generative language models.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
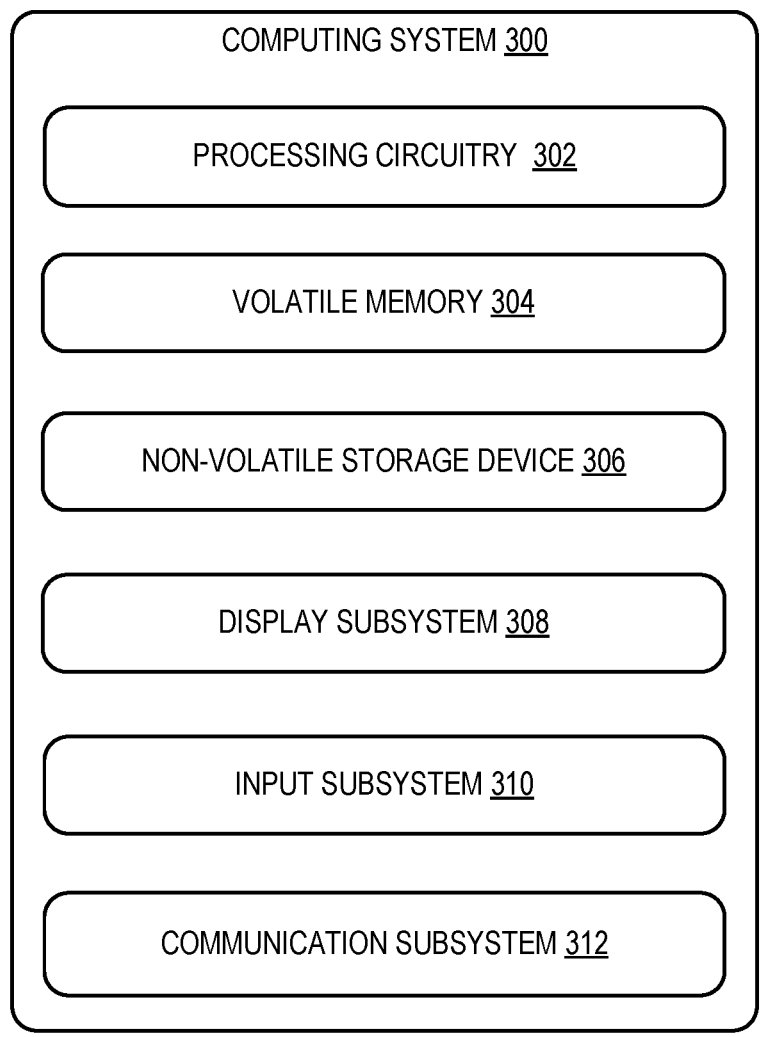
FIG. 6 shows a schematic view of an example computing environment in which the computing system of FIG. 1A or 1B may be enacted.

FIG. 6 schematically shows a non-limiting embodiment of a computing system 300 that can enact one or more of the methods and processes described above. Computing system 300 is shown in simplified form. Computing system 300 may embody the computing system 10 or 110 described above and illustrated in FIGS. 1A and 1B, respectively. Components of computing system 300 may be included in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 300 includes processing circuitry 302, volatile memory 304, and a non-volatile storage device 306. Computing system 300 may optionally include a display subsystem 308, input subsystem 310, communication subsystem 312, and/or other components not shown in FIG. 6.

Processing circuitry 302 typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 302 may be single-core or multi-core, and the instructions executed thereon may be configured for sequential, parallel, and/or distributed processing. Individual components of the processing circuitry optionally may be distributed among two or more separate devices, which may be remotely located and/or configured for coordinated processing. For example, aspects of the computing system disclosed herein may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 302.

Non-volatile storage device 306 includes one or more physical devices configured to hold instructions executable by the processing circuitry to implement the methods and processes described herein. When such methods and processes are implemented, the state of non-volatile storage device 306 may be transformed—e.g., to hold different data.

Non-volatile storage device 306 may include physical devices that are removable and/or built in. Non-volatile storage device 306 may include optical memory, semiconductor memory, and/or magnetic memory, or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by processing circuitry 302 to temporarily store information during processing of software instructions. It will be appreciated that volatile memory 304 typically does not continue to store instructions when power is cut to the volatile memory 304.

Aspects of processing circuitry 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via processing circuitry 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with processing circuitry 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, camera, or microphone.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 300 to send and/or receive messages to and/or from other devices via a network such as the Internet.

The following paragraphs provide additional support for the claims of the subject application. One aspect provides a computing system for monitoring language model compliance with a rubric of one or more output characteristics, the computing system comprising processing circuitry configured to interface with a trained generative model that receives input of a prompt including natural language text input and, in response, generates an output that includes natural language text output, monitor compliance of the generative model with the rubric, by feeding the output of the generative model to a rubric classifier that is in response configured to generate a predicted classification for an output characteristic in the rubric, and output the predicted classification. In this aspect, additionally or alternatively, the generative model may be a generative language model, the generative language model may be intermittently updated over a time period, and the processing circuitry may be configured to monitor compliance by feeding a plurality of outputs of the generative language model to the rubric classifier at a series of points in time during the time period, to thereby generate a time-series of predicted classifications for the output characteristic in the rubric. In this aspect, additionally or alternatively, the generative language model may be a first generative language model, the computing system may further comprise a second generative language model, and the plurality of outputs may be from synthetic interaction sessions between the first generative language model and the second generative language model. In this aspect, additionally or alternatively, the output characteristic may be one of a plurality of output characteristics included in the rubric of the generative model, the rubric classifier may be configured to, in response to being fed the output of the generative model, generate the predicted classification for each of the plurality of output characteristics in the rubric, and at least one of the plurality of output characteristics may comprise cultural sensitivity, fairness, inclusivity, wittiness, assertiveness, patience, friendliness, formality, empathy, profanity, verbosity, tone, topical relevance, factuality, and/or creativity. In this aspect, additionally or alternatively, the rubric classifier may include a plurality of classifier models, and each of the plurality of classifier models may have been trained to receive natural language text and generate a predicted classification for a respective one of the plurality of output characteristics, respectively, based on ground truth data. In this aspect, additionally or alternatively, the ground truth data may be a rubric database comprising outputs of a plurality of generative language models with corresponding classifications for each of the plurality of output characteristics. In this aspect, additionally or alternatively, the at least one processor may be further configured to take an action based upon the predicted classification for the characteristic. In this aspect, additionally or alternatively, the action may be to generate a subsequent prompt inputted into the generative model to thereby improve the predicted classification for the characteristic. In this aspect, additionally or alternatively, the subsequent prompt may be generated based on a calculated difference between the predicted classification and a target classification.

Another aspect provides a method for monitoring language model compliance with a rubric of output characteristics, the method comprising, via processing circuitry of a computing system interfacing with a trained generative model that receives input of a prompt including natural language text input and, in response, generates an output that includes natural language text output, monitoring compliance of the generative model with the rubric, by feeding the output of the generative model to a rubric classifier configured to generate a predicted classification for an output characteristic in the rubric, and outputting the predicted classification. In this aspect, additionally or alternatively, the predicted classification may be a numerical classification or a qualitative classification. In this aspect, additionally or alternatively, the generative model may be a generative language model, the generative language model may be intermittently updated over a time period, and compliance may be monitored by feeding a plurality of outputs of the generative language model to the rubric classifier at a series of points in time during the time period, to thereby generate a time-series of predicted classifications for the output characteristic in the rubric. In this aspect, additionally or alternatively, the generative language model may be a first generative language model, and the plurality of outputs may be from synthetic interaction sessions between the first generative language model and a second generative language model. In this aspect, additionally or alternatively, the output characteristic may be one of a plurality of output characteristics included in the rubric of the generative model, the rubric classifier may be configured to generate a predicted classification for each of the plurality of output characteristics in the rubric, and at least one of the plurality of output characteristics may comprise cultural sensitivity, fairness, inclusivity, wittiness, assertiveness, patience, friendliness, formality, empathy, profanity, verbosity, tone, topical relevance, factuality, and/or creativity. In this aspect, additionally or alternatively, the rubric classifier may include a plurality of classifier models, and each of the plurality of classifier models may have been trained to receive natural language text and generate a predicted classification for a respective one of the plurality of output characteristics, respectively, based on ground truth data. In this aspect, additionally or alternatively, the ground truth data may be stored in a rubric database comprising outputs of a plurality of generative language models with corresponding classifications for each of one or more characteristics. In this aspect, additionally or alternatively, the method may further include taking an action based upon the predicted classification for the output characteristic. In this aspect, additionally or alternatively, the action may be to generate a subsequent prompt inputted into the generative model to thereby improve the predicted classification for the output characteristic, and the subsequent prompt may be generated based on a calculated difference between the predicted classification and a target classification.

Another aspect provides a computing system for monitoring language model compliance with a rubric of one or more output characteristics, the computing system comprising processing circuitry configured to cause a interaction interface for a trained generative model to be presented, receive, via the interaction interface, natural language text input from a user for the trained generative model to generate an output, generate a prompt based at least on the natural language text input from the user, provide the prompt to the trained generative model, generate, in response to the prompt, the output via the trained generative model, based on the output of the generative model, generating a predicted classification for an output characteristic in the rubric, and outputting the predicted classification. In this aspect, additionally or alternatively, the generative model may be a multi-modal generative model configured to receive multi-modal input.

"And/or" as used herein is defined as the inclusive or V, as specified by the following truth table:

| A | B | A $\vee$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for monitoring language model compliance with a rubric of one or more output characteristics, the computing system comprising:
  processing circuitry configured to:
    interface with a trained generative model that receives input of a prompt including natural language text input and, in response, generates an output that includes natural language text output;
    monitor compliance of the generative model with the rubric, by feeding the output of the generative model to a rubric classifier that is in response configured to generate a predicted classification for an output characteristic in the rubric; and
    output the predicted classification, wherein
  the generative model is a generative language model;
  the generative language model is intermittently updated over a time period; and
  the processing circuitry is configured to monitor compliance by feeding a plurality of outputs of the generative language model to the rubric classifier at a series of points in time during the time period, to thereby generate a time-series of predicted classifications for the output characteristic in the rubric.

2. The computing system of claim 1, wherein
  the generative language model is a first generative language model;
  the computing system further comprises a second generative language model; and
  the plurality of outputs are from synthetic interaction sessions between the first generative language model and the second generative language model.

3. The computing system of claim 1, wherein
  the output characteristic is one of a plurality of output characteristics included in the rubric of the generative model; and
  the rubric classifier is configured to, in response to being fed the output of the generative model, generate the predicted classification for each of the plurality of output characteristics in the rubric.

4. The computing system of claim 3, wherein
  the rubric classifier includes a plurality of classifier models; and
  each of the plurality of classifier models has been trained to receive natural language text and generate a predicted classification for a respective one of the plurality of output characteristics, respectively, based on ground truth data.

5. The computing system of claim 4, wherein the ground truth data is a rubric database comprising outputs of a plurality of generative language models with corresponding classifications for each of the plurality of output characteristics.

6. The computing system of claim 1, wherein the at least one processor is further configured to take an action based upon the predicted classification for the characteristic.

7. The computing system of claim 6, wherein the action is to generate a subsequent prompt inputted into the generative model to thereby improve the predicted classification for the characteristic.

8. The computing system of claim 7, wherein the subsequent prompt is generated based on a calculated difference between the predicted classification and a target classification.

9. A method for monitoring language model compliance with a rubric of output characteristics, the method comprising, via processing circuitry of a computing system:
- interfacing with a trained generative model that receives input of a prompt including natural language text input and, in response, generates an output that includes natural language text output;
- monitoring compliance of the generative model with the rubric, by feeding the output of the generative model to a rubric classifier configured to generate a predicted classification for an output characteristic in the rubric; and
- outputting the predicted classification, wherein
- the generative model is a generative language model;
- the generative language model is intermittently updated over a time period; and
- compliance is monitored by feeding a plurality of outputs of the generative language model to the rubric classifier at a series of points in time during the time period, to thereby generate a time-series of predicted classifications for the output characteristic in the rubric.

10. The method of claim 9, wherein the predicted classification is a numerical classification or a qualitative classification.

11. The computing system of claim 3, wherein at least one of the plurality of output characteristics comprises cultural sensitivity, fairness, inclusivity, wittiness, assertiveness, patience, friendliness, formality, empathy, profanity, verbosity, tone, topical relevance, factuality, and/or creativity.

12. The method of claim 9, wherein
- the generative language model is a first generative language model; and
- the plurality of outputs are from synthetic interaction sessions between the first generative language model and a second generative language model.

13. The method of claim 9, wherein
- the output characteristic is one of a plurality of output characteristics included in the rubric of the generative model; and
- the rubric classifier is configured to generate a predicted classification for each of the plurality of output characteristics in the rubric.

14. The method of claim 13, wherein
- the rubric classifier includes a plurality of classifier models; and
- each of the plurality of classifier models has been trained to receive natural language text and generate a predicted classification for a respective one of the plurality of output characteristics, respectively, based on ground truth data.

15. The method of claim 14, wherein the ground truth data is stored in a rubric database comprising outputs of a plurality of generative language models with corresponding classifications for each of one or more characteristics.

16. The method of claim 9, wherein
- the method further includes taking an action based upon the predicted classification for the output characteristic.

17. The method of claim 16, wherein
- the action is to generate a subsequent prompt inputted into the generative model to thereby improve the predicted classification for the output characteristic; and
- the subsequent prompt is generated based on a calculated difference between the predicted classification and a target classification.

18. A computing system for monitoring language model compliance with a rubric of one or more output characteristics, the computing system comprising:
- processing circuitry configured to:
  - cause a interaction interface for a trained generative model to be presented;
  - receive, via the interaction interface, natural language text input from a user for the trained generative model to generate an output;
  - generate a prompt based at least on the natural language text input from the user;
  - provide the prompt to the trained generative model;
  - generate, in response to the prompt, the output via the trained generative model;
  - based on the output of the generative model, generating a predicted classification for an output characteristic in the rubric; and
  - outputting the predicted classification, wherein
  - the generative model is a generative language model;
  - the generative language model is intermittently updated over a time period; and
  - compliance is monitored by feeding a plurality of outputs of the generative language model to a rubric classifier at a series of points in time during the time period, to thereby generate a time-series of predicted classifications for the output characteristic in the rubric.

19. The computing system of claim 18, wherein the generative model is a multi-modal generative model configured to receive multi-modal input.

20. The method of claim 13, wherein at least one of the plurality of output characteristics comprises cultural sensitivity, fairness, inclusivity, wittiness, assertiveness, patience, friendliness, formality, empathy, profanity, verbosity, tone, topical relevance, factuality, and/or creativity.

* * * * *